United States Patent [19]

Osanai

[11] 4,079,277
[45] Mar. 14, 1978

[54] FLAT MINIATURE DYNAMOELECTRIC MACHINE

[75] Inventor: Akira Osanai, Hachioji, Japan

[73] Assignee: Olympus Optical Company, Ltd., Tokyo, Japan

[21] Appl. No.: 622,529

[22] Filed: Oct. 15, 1975

[30] Foreign Application Priority Data

| Oct. 15, 1974 | Japan | 49/118400[U] |
|---|---|---|
| Oct. 15, 1974 | Japan | 49/124140[U] |
| Nov. 26, 1974 | Japan | 49/144069[U] |
| Nov. 26, 1974 | Japan | 49/144070[U] |
| Nov. 26, 1974 | Japan | 49/144071[U] |
| Nov. 29, 1974 | Japan | 49/145163[U] |
| Nov. 29, 1974 | Japan | 49/145164[U] |
| Nov. 29, 1974 | Japan | 49/145165[U] |
| Dec. 10, 1974 | Japan | 49/149419[U] |
| Dec. 17, 1974 | Japan | 49/153560[U] |
| Dec. 17, 1974 | Japan | 49/153561[U] |
| Dec. 17, 1974 | Japan | 49/153562[U] |
| Dec. 17, 1974 | Japan | 49/153563[U] |
| Dec. 17, 1974 | Japan | 49/153564[U] |
| Dec. 17, 1974 | Japan | 49/153565[U] |
| Dec. 17, 1974 | Japan | 49/153566[U] |
| Dec. 27, 1974 | Japan | 50/263[U] |
| Dec. 27, 1974 | Japan | 50/264[U] |

[51] Int. Cl.² .............................................. H02K 5/16
[52] U.S. Cl. .................................... 310/90; 310/239; 310/268
[58] Field of Search ................. 310/268, 191, 209, 91, 310/154, 239, 219, 90, 231

[56] References Cited

U.S. PATENT DOCUMENTS

| 3,280,353 | 10/1966 | Haydon et al. | 310/154 |
|---|---|---|---|
| 3,315,106 | 4/1967 | Reynst | 310/268 |
| 3,348,086 | 10/1967 | Monma | 310/268 |
| 3,512,025 | 5/1970 | Quellet | 310/268 |
| 3,525,008 | 8/1970 | Burr | 310/268 |
| 3,678,314 | 7/1972 | Carter | 310/268 |
| 3,953,751 | 4/1976 | Merkle et al. | 310/91 |

Primary Examiner—Donovan F. Duggan
Attorney, Agent, or Firm—Ostrolenk, Faber, Gerb & Soffen

[57] ABSTRACT

A dynamoelectric machine comprises a flat coreless rotor rotatably mounted in a housing which also serves as a yoke, a commutator integrally mounted on the rotor, a magnet disposed in juxtaposition with and in opposing relationship with one of the major surfaces of the rotor, and a brush assembly disposed for sliding contact with the commutator. The commutator is electrically connected with the rotor winding on the side of the rotor which is adjacent to the one major surface thereof, and extends to the opposite side of the rotor for sliding engagement with the brush assembly, whereby the dynamoelectric machine is miniaturized.

4 Claims, 43 Drawing Figures

FIG. 17 PRIOR ART
FIG. 18 PRIOR ART
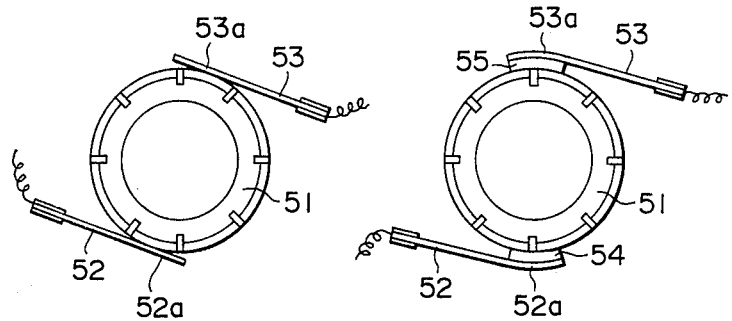
FIG. 19
FIG. 20
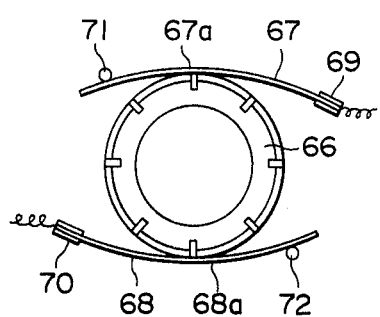
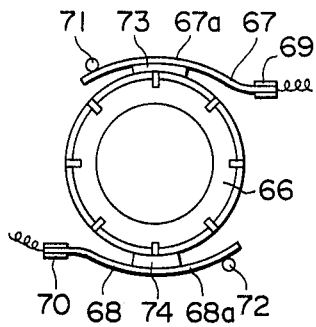

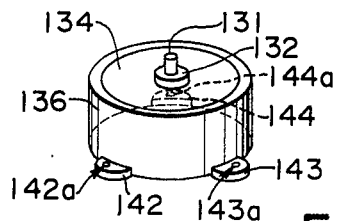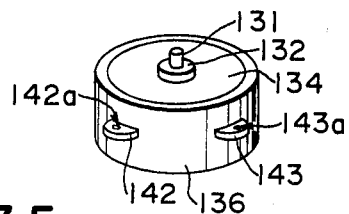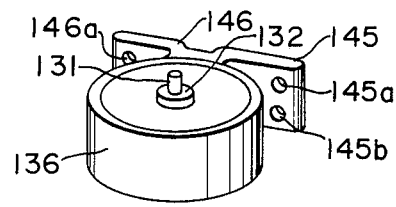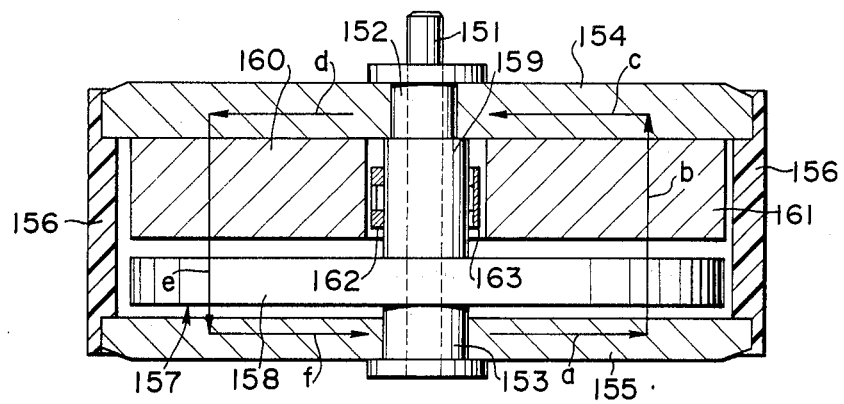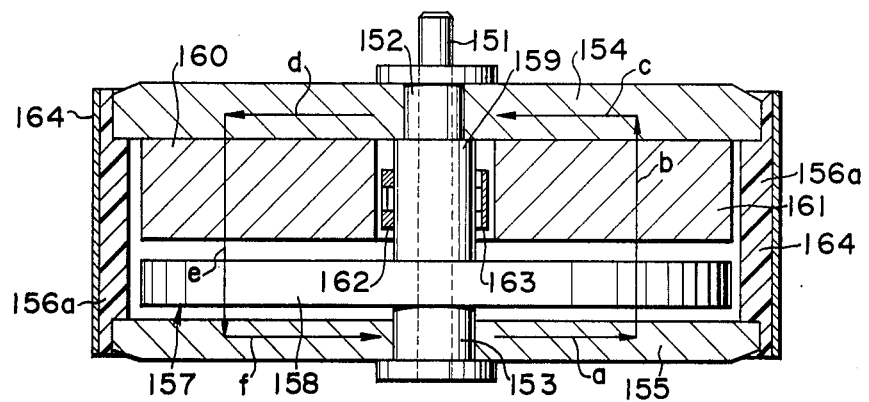

FLAT MINIATURE DYNAMOELECTRIC MACHINE

BACKGROUND OF THE INVENTION

The invention relates to a flat miniature dynamoelectric machine which may be used as either motor or generator or the like. A flat miniature dynamoelectric machine is known which has a rotor of a reduced thickness and a permanent magnet which are disposed in axial alignment therewith, thus minimizing the axial thickness of the machine. Such a flat miniature dynamoelectric machine may be operated as a motor for use in a small size electrical instrument such as a portable cassette tape recorder. In a conventional flat miniature dynamoelectric machine, the whole commutator is disposed on one side of the rotor, so that there must be provided separate spaces for the provision of the rotor and the commutator, resulting in an increased overall space requirement.

SUMMARY OF THE INVENTION

It is a primary object of the invention to provide a flat miniature dynamoelectric machine in which a portion of the commutator which is adapted to slidably engage a brush assembly is disposed on one side of the rotor while the electrical connection between the commutator and the rotor is located on the opposite side of the rotor so that the space occupied by the rotor is also occupied by a portion of the commutator, thus minimizing the space requirement. It is another object of the invention to provide a flat miniature dynamoelectric machine incorporating a sophisticated design in the brush assembly or housing so as to improve the accuracy and the performance.

BRIEF DESCRIPTION OF THE DRAWINGS

FIGS. 17 and 18 are front views of a commutator and a brush assembly in conventional designs;

FIGS. 19 and 20 are front views of a commutator and a brush assembly, showing the relative disposition in accordance with the invention;

FIGS. 33 to 35 are perspective views illustrating the manner of mounting the flat miniature motor according to the invention;

FIGS. 36 and 37 are longitudinal sections illustrating additional embodiments of the flat miniature motor according to the invention;

DETAILED DESCRIPTION OF EMBODIMENTS

Figure 1:
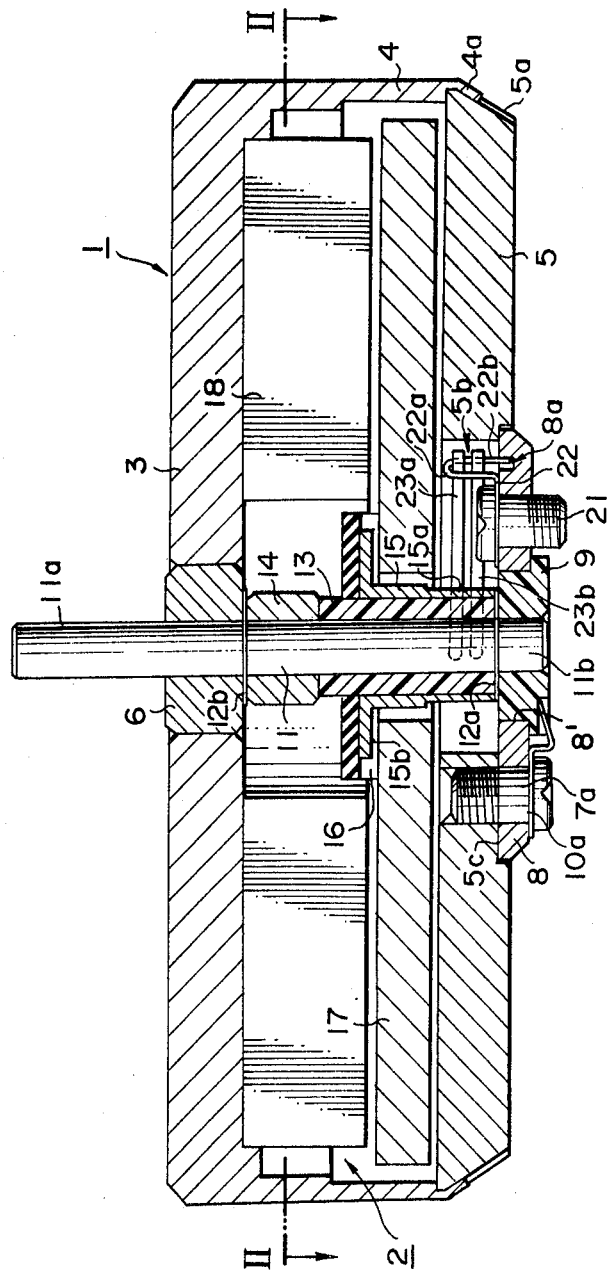
FIG. 1 is a longitudinal section of a flat miniature motor constructed in accordance with one embodiment of the invention, the section being taken along the line I—I shown in FIG. 3.
Figure 3:
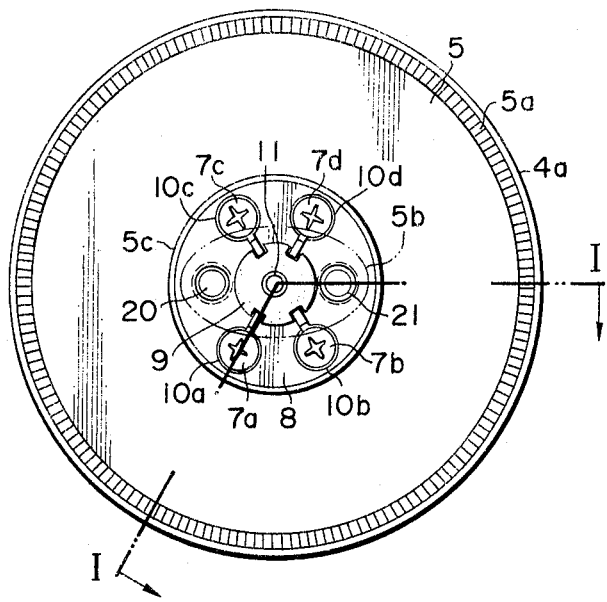
FIG. 3 is a bottom view to a reduced scale, showing the bottom of the motor shown in FIG. 1.

Referring to FIG. 1, there is shown a flat miniature motor 1 which is constructed in accordance with the invention. The motor 1 includes a housing 2 which comprises an upper yoke 3 having an integral cylindrical frame portion 4 which is secured to a lower disc-shaped yoke 5. The lower portion of the periphery of the lower yoke 5 is chamfered to form a knurling 5a, which is engaged by the lower edge 4a of the frame portion 4 as by caulking (see FIG. 3).

In FIG. 1, an upper bearing 6 is fitted centrally into the upper yoke 3 while the lower yoke 5 is centrally formed with an elliptical slot 5b (see FIG. 3) which may be used for disposing a brush assembly therein. A circular step 5c is formed centrally in the lower surface of the lower yoke 5, and a disc-shaped brush supporting plate 8 of an insulating material is secured to the step 5c by means of four mounting screws 7a, 7b, 7c and 7d (see FIG. 3), thus covering the slot 5b. A lower bearing 9 is fitted centrally in an opening 8b in the brush supporting plate 8, and is locked against disengagement by the free end of locking members 10a, 10b, 10c and 10d which are secured to the mounting screws 7a to 7d.

Figure 2:
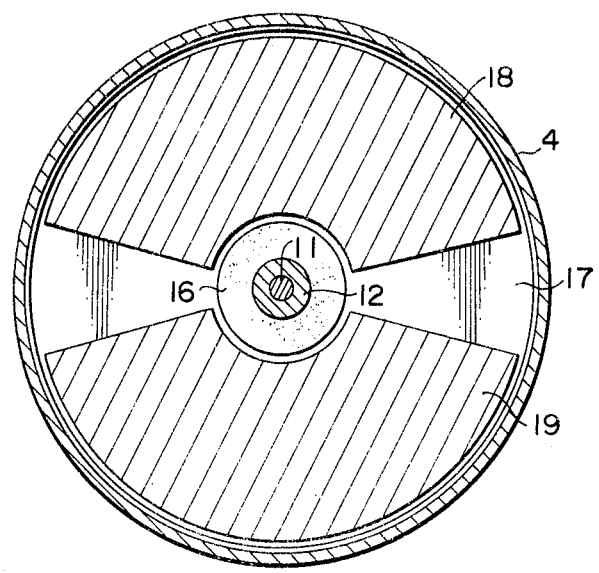
FIG. 2 is a cross section to a reduced scale taken along the line II—II shown in FIG. 1.

The pair of bearings 6, 9 rotatably support an output shaft 11 of the motor at its upper end 11a, adapted for connection with an external apparatus, as well as at its lower end 11b, respectively. A thrust washer 12a is mounted on the output shaft 11 adjacent to the lower bearing 9, and an insulating sleeve 13 is fixedly mounted on the output shaft 11 above the washer 12a. A spacer ring 14 is fitted on the output shaft adjacent to the insulating sleeve, and another thrust washer 12b is mounted on the shaft between the bearing 6 and the spacer ring 14. Fitted on the insulating sleeve 13 are a commutator 14, and a rotor support 16 which fixedly carried a rotor 17. A pair of permanent magnets 18, 19 (see FIG. 2) secured to the upper yoke 3 is located oppositely to and above the rotor 17.

A pair of electrically conductive screws 20, 21 (see FIG. 3) threadably engage the brush supporting plate 8, and are located within the slot 5b at symmetrical positions with respect to the shaft 11. As shown at 21 is FIG. 1, the both screws fix one end of a brush holder 22 comprising a resilient, conductive material to the brush supporting plate 8, and themselves serve as conductive terminals for external connection.

Referring to FIG. 1, the brush holder 22 is bent upwardly and then folded back to form an upstanding portion 22a and a folded portion 22b which cooperate to hold one end of a pair of brushes 23a, 23b therebetween, the lower end of the folded portion 22b being fitted into a detent hole 8a formed in the brush supporting plate 8. In this manner, the pair of brushes 23a, 23b are resiliently supported. The other brush holder, not shown, which is secured to the brush supporting plate 8 by the other screw 20 holds a pair of brushes, not shown, which are similar to the brushes 23a, 23b, and all of these brushes are disposed so that their free end is in sliding contact with the peripheral surface of an engaging portion 15a of the commutator 15. On the opposite side of the rotor 17 from the location of the engaging portion 15a, the commutator 15 includes a flange 15b which serves the electrical connection between the commutator and the rotor winding. When the conductive screws 20, 21 are connected with a power source, not shown, the rotor winding is energized through the brushes 23a, 23b and the commutator 15 to cause the rotor to rotate through a magnetic interaction with the pair of permanent magnets 18, 19, thus providing a mechanical output from the output shaft 11.

Figure 4:
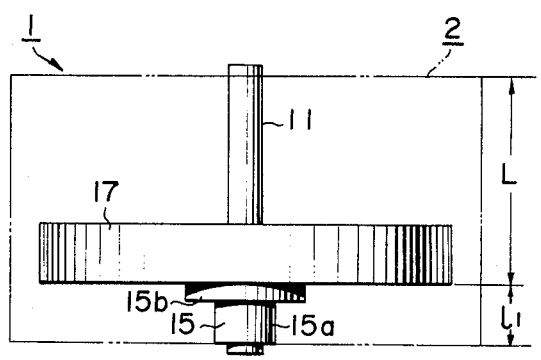
FIG. 4 is a side elevation schematically illustrating a conventional flat miniature motor.
Figure 5:
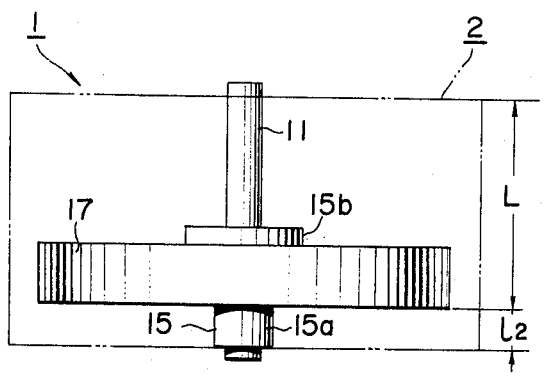
FIG. 5 is a side elevation schematically illustrating the flat miniature motor according to the invention.

As mentioned previously, the engaging portion 15a and the interconnecting flange 15b of the commutator 15 are located on the opposite sides of the rotor 17. Referring to FIG. 4 momentarily which shows the prior art, the entire commutator 15 has been located on one side of the rotor 17, so that the machine had to accommodate a space corresponding to the vertical height $l_1$ in addition to the space corresponding to the vertical height L which is required for receiving the rotor and the like. However, in accordance with the invention, the interconnecting flange 15b is shown on the opposite side of the rotor 17 from the engaging portion 15a as shown in FIG. 5, so that the space required to accommodate the commutator corresponds to a reduced vertical height $l_2$, thus enabling a reduction in the size of the housing 2. It will be readily seen from FIG. 1 that the rotor receiving space (L) can afford to receive the interconnecting flange 15b without any increase in the size of the housing.

The upper bearing 6 shown in FIG. 1 comprises a so-called oilless bearing, such as an oil impregnated bearing formed by a bronze or iron metal which is made porous as by sintering, an oil impregnated bearing formed of a synthetic resin or a bearing formed of a synthetic resin having selflubricating characteristic. The bearing 6 carries a major proportion of the load on the output shaft 11, and hence requires a sufficient lubrication. However, if the shaft is lubricated at this position, the lubricant may be conducted along the shaft 11 to reach the commutator 15 or brushes 23a, 23b, causing a degradation in their electrical performance or contamination thereof by absorption of dusts thereto. It may appear that a collar for preventing a flow of the lubricant may be mounted on the upper portion of the shaft 11, but this results in a complex structure to prevent a miniaturization of the motor 1. In accordance with the invention, the use of an oilless bearing prevents a flow of the lubricant without employing a collar.

By using a bearing formed of a synthetic resin as the lower bearing 9 as shown in the disclosed embodiment, the manufacturing cost can be reduced. Because the lower bearing 9 is not connected with a mechanical part, the load thereon is very much reduced as compared with the load on the upper bearing 6. Thus, the lower bearing may not be provided with lubricating means without causing a degradation in the performance of the motor 1.

As mentioned above, the brush supporting plate 8 carries the lower bearing 9 as well as the brush holder 22 which support the brushes 23a, 23b, and is secured to the lower yoke. In assembly, the brushes 23a, 23b and their counterpart are mounted on the brush supporting plate 8, which is then mounted on the lower yoke 5. By inserting a tool through a bore 8' which is formed in the brush supporting plate 8 for receiving the bearing, the brushes 23a, 23b can be trimmed to adjust the degree of abutment against the output shaft 11. Subsequently, the lower yoke 5 is rotated relative to the frame portion 4 or permanent magnets 18, 19 in order to adjust the position of the brushes 23a, 23b. Thereafter the lower bearing 9 is mounted in place in the brush supporting plate 8 and locked by fixedly attaching the locking members 10a, 10b, 10c and 10d to the brush supporting plate 8 by means of the mounting screws 7a, 7b, 7c and 7d. Any misalignment in the location of the lower bearing 9 can be readily corrected by slightly loosening the mounting screws 7a to 7d and slightly displacing the brush supporting plate 8 relative to the lower yoke 5.

In the present embodiment, the brushes 23a, 23b are disposed within the slot 5b in the lower yoke 5 and are carried by the brush supporting plate 8 which is mounted on the yoke and on which the lower bearing 9 is mounted, so that a large proportion of the space required for the provision of the brushes can be supplied by the thickness of the lower yoke 5. The brush supporting plate 8 and the lower bearing 9 can be easily assembled. By molding the brush supporting plate 8 from a synthetic resin such as delrin and the lower bearing 9 from a thermosetting resin, their manufacturing is greatly simplified. The circular step 5c in the lower yoke 5 has a diameter which is slightly greater than that of the brush supporting plate 8 so as to permit an easy adjustment of the position thereof. The adjustment of the position and alignment of the bearing 9 can be easily achieved in the present embodiment, assuring a flat miniature dynamoelectric machine of a high accuracy and which is free from misalignment of the output shaft.

As mentioned previously, the knurling 5a is formed in the lower periphery of the lower yoke 5 by chamfering, so that a desired relative position of the brushes 23a, 23b relative to the permanent magnets 18, 19 can be easily achieved by engaging one hand with the knurling 5a to rotate the lower yoke 5. After adjustment, the lower edge 4a of the frame portion 4 is caulked to the knurling to prevent any further relative rotation. The utilization of the conductive screws 20, 21 which secure the holder 22 to the brush supporting plate 8, also as external terminals result in a reduction in the number of parts used, thus contributing to the miniaturization of the machine.

Figure 6:
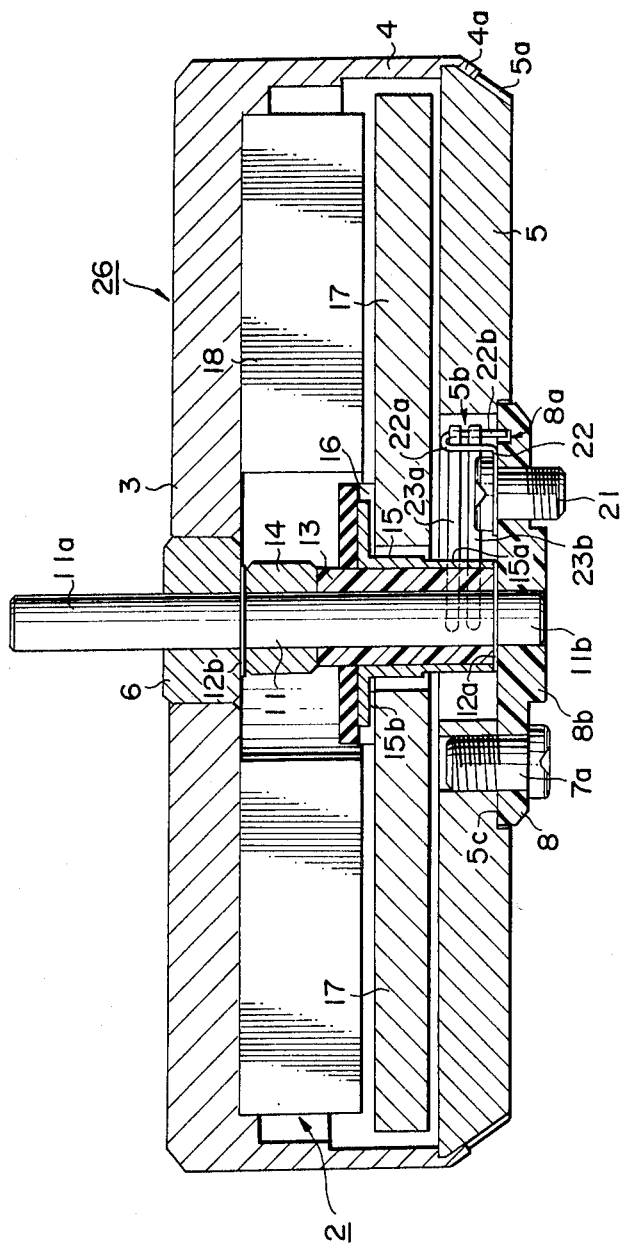
FIG. 6 is a longitudinal section of a flat miniature motor constructed in accordance with another embodiment of the invention.

FIG. 6 shows another motor 26 according to the invention which is generally similar to the motor 1 shown in FIG. 1, and corresponding parts are designated by like reference characters. The only difference between the two motors is the fact that the lower bearing which supports the lower end 11b of the output shaft 11 and the brush supporting plate are integrally molded from an insulating synthetic resin. Specifically, the brush supporting plate 8 is integrally molded with the lower bearing 8b, eliminating the need for the locking members 10a to 10d and thus reducing the number of parts used and contributing to the miniaturization of the machine.

Figure 7:
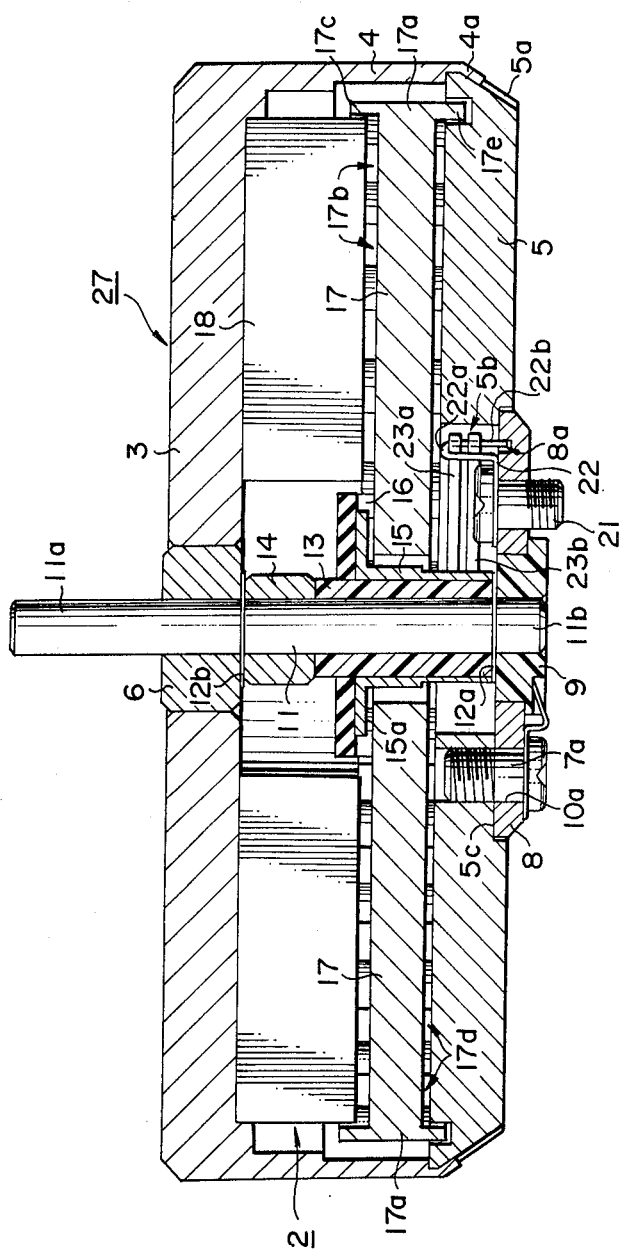
FIG. 7 is a longitudinal section of a flat miniature motor constructed in accordance with a further embodiment of the invention.
Figure 8:
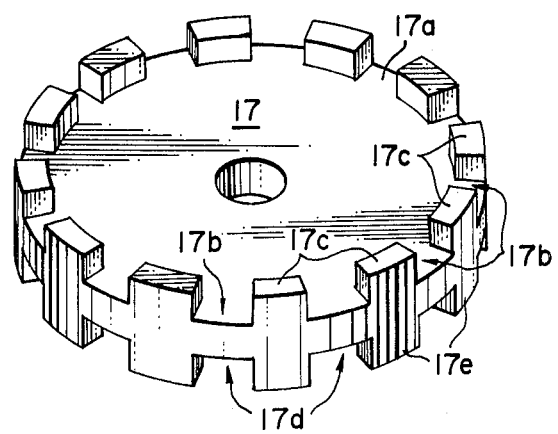
FIGS. 8 to 10 are fragmentary perspective views of examples of the rotor.

In FIG. 7, a further motor 27 constructed in accordance with the invention is illustrated in which the rotor 17 includes a peripheral edge 17a which comprises an alternation of recesses 17b, 17d and projections 17c, 17e (see FIG. 8) for the purpose of balancing. In other respects, the motor 27 is similar to the motor 1 shown in FIG. 1, and corresponding parts are designated by like reference characters. More specifically, the peripheral edge 17a of the rotor 17 includes a plurality of recesses 17b and a plurality of projections 17c on its upper surface, and also includes a plurality of recesses 17d and a plurality of projections 17e on its lower surface. The rotor 17 can be dynamically balanced by filling the recesses 17b, 17d with weighting material such as lead to the same level as the projections 17c, 17e or by removing any required amount of material from the projections 17c, 17e. The balancing of the rotor 17 is performed after mounting the rotor 17 on the output shaft 11, by using any conventional technique such as using a circuit tester.

Figure 9:
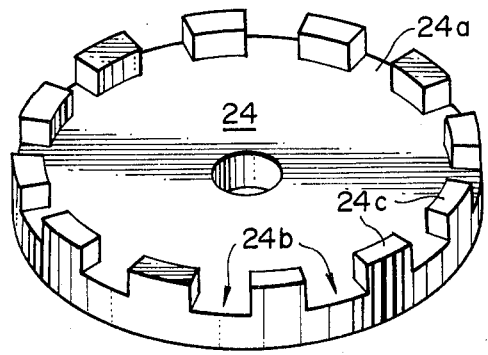
Figure 10:
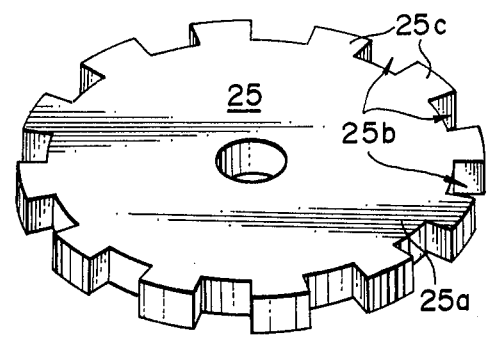

FIG. 9 shows another example of the rotor 24 having a peripheral edge 24a which comprises a plurality of recesses 24b and a plurality of projections 24c formed only on its upper surface. FIG. 10 shows a further example of the rotor 25 having a peripheral edge 25a which comprises an alternation of a radially extending projections 25c interspersed with recesses 25b. It should be understood that these recesses and projections can be located as desired on the peripheral edge of the rotor.

Figure 11:
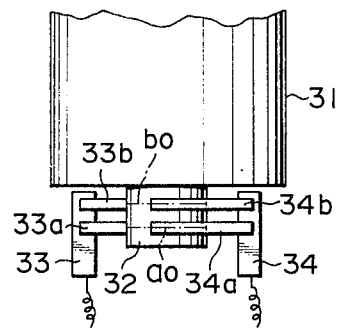
FIG. 11 is a top view of a conventional arrangement of contact between a commutator and a brush assembly.

An improvement in the manner of contact between the commutator and the brushes which is achieved in accordance with the invention will now be described. Before describing the improvement of the invention, a prior art arrangement for the brush assembly will be described with reference to FIG. 11. A motor 31 shown includes a commutator 32 and a pair of electrically conductive brushes 33, 34, the engaging portions 33a, 33b and 34a, 34b of which are adapted to be maintained in sliding contact with the periphery of the commutator 32 at positions which are displaced from each other by an angle of 180°. The locus of the engaging portions 33a, 34a on the commutator 32 and the locus of the engaging portions 33b, 34b on the commutator 32 are indicated by phantom lines $a_0$, $b_0$. It will be noted that the locus of the engaging portion 33a and that of the engaging portion 34a coincide with each other, so that if the engaging portion 33a is in good sliding contact with the surface of the commutator 32, the latter may be roughened by the other engaging portion 24a, resulting in a rapid abrasion of both the surface of the commutator 32 and the conductive brushes.

Figure 12:
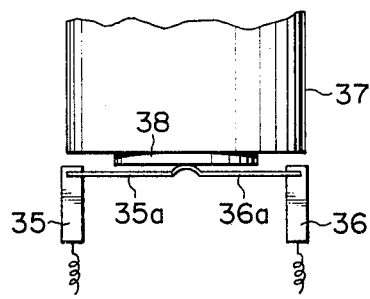
FIG. 12 is a top view showing the manner of contact between a commutator and a brush assembly in accordance with the invention.
Figure 13:
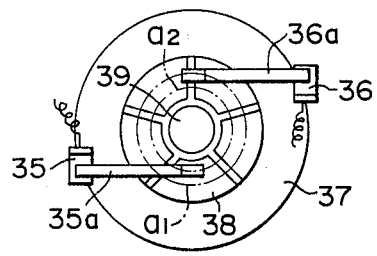
FIG. 13 is a front view of the commutator and the brush assembly shown in FIG. 12.

FIGS. 12 to 16 show several arrangements of the brush assembly relative to the commutator according to the invention wherein the locus of any one particular conductive brush follows a path on the commutator which is different from that of any other conductive brush, thus eliminating or minimizing the abrasion and the unstable electrical conductivity. In FIGS. 12 to 13, there is shown a brush assembly comprising a pair of conductive brushes 35 and 36 having respective engaging portions 35a and 36a which are adapted to engage the end face of a commutator 38 of a motor 37. As shown in FIG. 13, the both brushes 35, 36 are disposed so that their resilient engaging portions 35a, 36a engage the commutator 38 at diametrically opposite positions relative to a shaft 39 or displaced from each other by 180°. The locus of the engaging portion 35a on the commutator 38 is depicted at $a_1$ while the locus of the engaging portion 36a on the commutator 38 is depicted at $a_2$. It will be noted that the locus $a_1$ is located on a radius which is greater than that of the locus $a_2$, so that they do not overlap each other.

Figure 14:
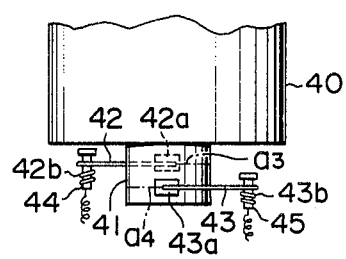
FIGS. 14 to 16 are top views illustrating other arrangements of contact between the commutator and the brush assembly which may be employed in the present invention.

FIG. 14 shows a motor 40 having a commutator 41, the peripheral surface of which is engaged by a plate-shaped engaging portion 42a, 43a of a pair of conductive brushes 42, 43. In this instance, the engaging portions 42a, 43a depict a respective locus $a_3$, $a_4$ on the commutator 41, which are axially displaced from each other, thus avoiding the overlapping relationship. The conductive brushes 42, 43 are formed of a resilient metal wire, and have their one end coiled to form a spring 42b, 43b which is fitted on a supporting stud 44, 45, thus urging the brushes 42, 43 to engage the commutator 41.

Figure 15:
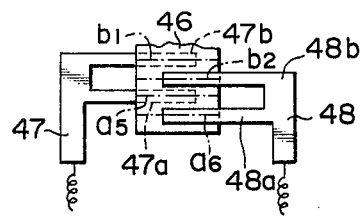
Figure 16:
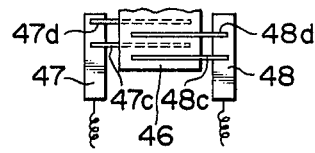

FIG. 15 shows a brush assembly which is substantially similar to that shown in FIG. 14. Specifically, a commutator 46 is engaged by a pair of conductive brushes 47, 48 which are each in the form of a leaf spring. The engaging portions 47a, 47b and 48a, 48b of the brushes 47, 48 engage the periphery of the commutator 46 at positions which are displaced from each other axially of the commutator, as indicated by loci $a_5$, $b_1$, $a_6$ and $b_2$. As indicated in FIG. 16, the engaging portions may be formed as a resilient metal wire 47c, 47d, 48c or 48d.

With these arrangements, a pair of conductive brushes engage the commutator at different positions without any overlapping relationship therebetween between the loci of the respective brushes, so that the abrasion is reduced to nearly one-half that experienced in the prior art. In addition, the individual brush engages the commutator at a portion thereof which is not disrupted by any other brush, assuring a smooth sliding engagement to reduce the noises generated.

A forced abutment of the brushes against the commutator will be considered next. Referring to FIG. 17 which shows a brush assembly of a conventional d.c. motor, a commutator 51 is engaged by a pair of conductive brushes 52, 53 which are located on the opposite side thereof and which have their other end fixedly mounted. The engaging portions 52a, 53a located at their free end resiliently bear against the peripheral surface of the commutator 51 at positions which are by 180° displaced from each other. Alternatively, FIG. 18 shows another prior art arrangement in which the engaging portions 52a, 53a each carry a shoe 54, 55 of the same curvature as that of the commutator 51.

With such conventional arrangements, the conductive brushes are supported in a cantilever fashion, and it is impossible to eliminate a bouncing movement thereof, resulting in an unstable motor operation or the generation of noises. While such disadvantages are reduced in the prior art arrangement shown in FIG. 18, there still remains a mechanical loss such as the abrasion of the commutator. While the problem can be overcome by increasing the number of brushes, the resulting arrangement will be complex to cause an increased cost.

FIGS. 19 and 20 show arrangements according to the invention to which a flexure is introduced in the conductive brushes for facial contact with the commutator to overcome the above mentioned disadvantages of the prior art, without using any complex arrangement. In FIG. 19, a pair of conductive brushes 67, 68 are disposed above and below a commutator 66, and have their one end carried by a suitable holding member 69, 70, while their free end is urged by a stationary pin 71, 72 to flex engaging portions 67a, 68a for sliding contact with the commutator. As a result, the engaging portions 67a, 68a will become curved in conformity to the peripheral surface of the commutator 66 for facial contact therewith.

In this arrangement, the engaging portions 67a, 68a may be provided with a shoe 73, 74 (see FIG. 20) having the same curvature as that of the peripheral surface of the commutator 66. In this instance, the contact between the conductive brushes 67, 68 and the commutator 66 can be made more stable. It will be appreciated that a flexure can be introduced into the conductive brushes 67, 68 by other means than the combination of the holding members 69, 70 and the pins 71, 72, such as substituting tension springs for the pins 71, 72. With the described arrangement, a facial contact rather than a lineal contact is achieved between the conductive brushes and commutator to increase the area of contact, and also bouncing of the brushes is avoided to assure a smooth sliding contact. Consequently, noises are minimized, and the useful life is drastically increased and the motor operation is made more stable.

When it is desired to reduce the overall size of a dynamoelectric machine, there is a limit on the miniaturization of major parts such as the rotor or commutator, so that the effort must be directed to the bearings and housing. Although much concern has been directed to the performance of a bearing in a miniature dynamoelectric machine, there has been no satisfactory solution to a thrust bearing. In accordance with the invention, a portion of the peripheral surface of the commutator which is engaged by the brushes is formed with peripheral grooves, which are engaged by the brushes to minimize an axial movement of the commutator as well as the motor shaft. Such an arrangement also assures a satisfactory contact between the brushes and the commutator, further reducing the electrical noises generated.

Figure 21:
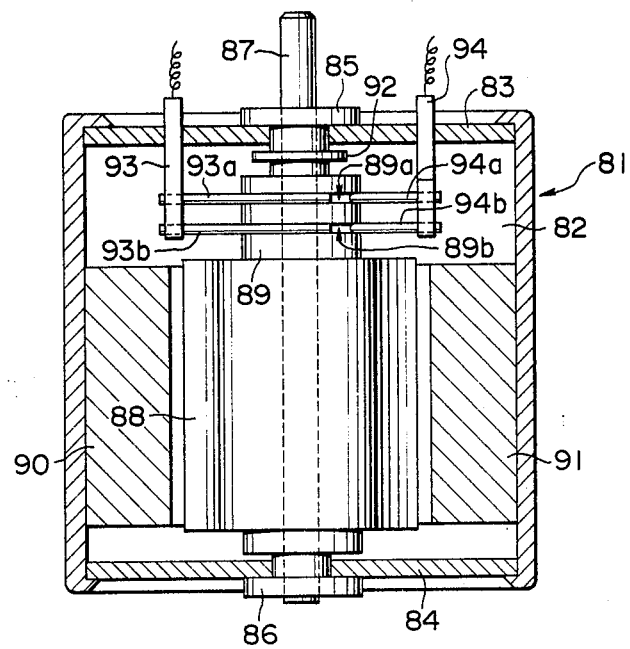
FIG. 21 is a longitudinal section of a motor which incorporates the manner of abutment between a commutator and a brush assembly according to the invention.

Referring to FIG. 21, there is shown a miniature motor 81 having a housing which comprises a cylindrical outer frame 82, and a pair of end plates 83, 84 which are secured to the opposite ends thereof. A pair of bearings 85, 86 are received centrally in the both end plates 83, 84 for rotatably supporting an output shaft 87. A rotor 88 is fixedly mounted on the portion of the output shaft 87 extending between the end plates 83, 84 at a position toward the lower bearing 86, while a commutator 89 integral with the rotor 88 is fixedly mounted thereon at a position toward the upper bearing 85. A pair of permanent magnets 90, 91 surround the rotor 88 and are fixedly mounted on the inside of the outer frame 82. An oil stop ring 92 is fitted on the shaft 87 intermediate the bearing 85 and the commutator 89.

Figure 22:
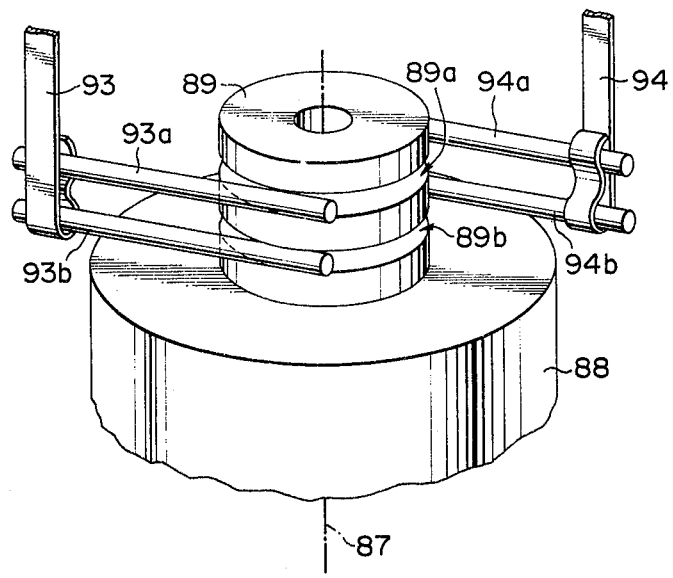
FIG. 22 is a fragmentary perspective view of the motor shown in FIG. 21.

As shown in FIG. 22, the commutator 89 is formed with a pair of circumferentially extending grooves 89a, 89b, and a pair of brushes 93a, 94a and a pair of brushes 93b, 94b are resiliently urged to engage these grooves. The brushes 93a, 93b are retained by a support 93 which is secured to the upper end plate 83 and which is folded on itself, and the remaining brushes 94a, 94b are similarly supported by a support 94 which is secured to the upper end plate 83. The pair of supports 93, 94 extend through the upper end plate 83 for connection with a power source, not shown. In this manner, the commutator 89 is fed through a sliding contact with the brushes 93a, 93b and 94a, 94b, whereby the rotor 88 rotates by a magnetic interaction with the permanent magnets 90, 91, with its rotation being outputted through the output shaft 87.

With the miniature dynamoelectric machine described, the brushes which are urged into the grooves 89a, 89b in the commutator 89 prevents or suppresses an axial movement thereof. In addition, a facial contact is advantageously achieved between the brushes and the commutator 89. In the embodiment shown, the respective brushes are in the form of a round rod, and hence the grooves 89a, 89b are also in the form of a round groove. However, it should be understood that the configuration of the grooves can be chosen in conformity to the profile of the brushes.

Referring to FIGS. 23 to 30, a brush assembly which is used in the present invention will be described. In a conventional miniature motor or generator, the brushes which are maintained in sliding contact with the commutator are formed of a wire of a noble metal material such as gold, silver, platinum or an alloy thereof in order to reduce the problems of friction and wire breakage. However, these wires also must have a sufficient resiliency, which however imposes a restriction on their thickness. On the other hand, if the diameter of the portion which engages the commutator is thin, a premature abrasion will result. In accordance with the invention, this difficulty is overcome by increasing the diameter of the engaging portion of the brushes while their shank has a reduced diameter to provide a satisfactory resiliency, thus providing a sufficient abrasion resistance.

Figure 23:
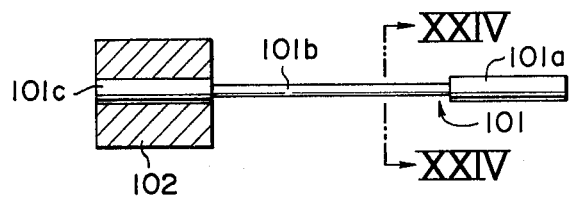
FIG. 23 is a side elevation of one example of a brush assembly which is used in the present invention.
Figure 24:
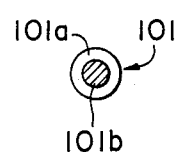
FIG. 24 is a cross section taken along the line XXIV—XXIV shown in FIG. 23.

Referring to FIGS. 23 and 24, there is shown a brush assembly 101 for use in a miniature motor which comprises an engaging portion 101a for sliding contact with a commutator, a shank 101b which holds the engaging portion 101a, and a mount 101c. The brush assembly 101 is formed from a wire of a noble metal material which is thick enough to form the engaging portion 101a and the mount 101c. After securing the mount 101c to a support 102, the wire is chemically polished or electrolytically polished to a desired thickness, thus forming the shank 101b of a reduced diameter. Since the engaging portion 101a has an increased diameter and cannot be easily abraded through sliding contact with the commutator, and since the shank 101b has a reduced diameter, the engaging portion 101a may be urged against the commutator with sufficient resilience.

Figure 25:
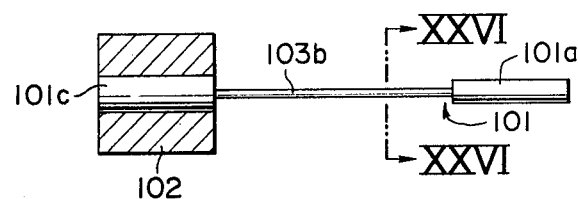
FIG. 25 is a side elevation of another example of a brush assembly which may be also used in the present invention.
Figure 26:
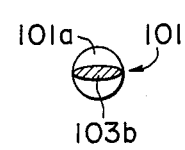
FIG. 26 is a cross section taken along the line XXVI—XXVI shown in FIG. 25.
Figure 27:
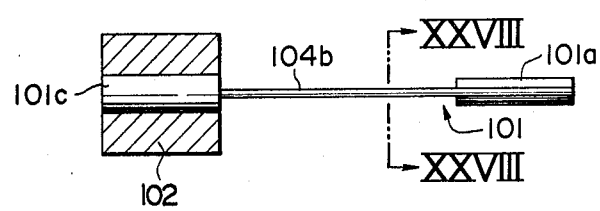
FIG. 27 is a side elevation of a further example of a brush assembly which may be used in the present invention.
Figure 28:
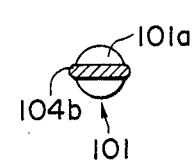
FIG. 28 is a cross section taken along the line XXVIII—XXVIII shown in FIG. 27.
Figure 29:
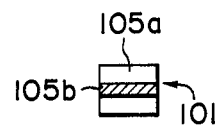
FIGS. 29 and 30 are cross sections illustrating additional examples of a brush assembly which may be used in the present invention.
Figure 30:
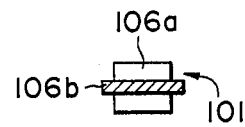

FIGS. 25 to 30 show brushes which have an improved shank resilience or improved smoothness of contact with the commutator, by subjecting the brush shown in FIG. 23 to a rolling operation. Specifically, FIGS. 25 and 26 show that the shank 101b of the brush 101 is rolled into a shank 103b of an elliptical cross section having a major diameter which is equal to that of the engaging portion 101a. FIGS. 27 and 28 show that the shank of the brush 101 is rolled into a shank 104b of an elliptical cross section having a major diameter which is greater than that of the engaging portion 101a. The shank 101b may be rolled into a rectangular configuration as shown at 105b, 106b in FIGS. 29 and 30. Similarly, the engaging portion 101a may also be rolled into a rectangular configuration as shown at 105a, 106a. This increases the rigidity of the shank, assuring a more reliable abutment of the engaging portion against the commutator. It should be understood that the rolled profile of both the engaging portion and the shank may be other than circular and rectangular forms.

A conventional miniature motor is mounted on an instrument such as a tape recorder by using a mounting member such as a band. However, this increases the overall size of the instrument and also requires a complex assembling operation. In addition, it is necessary to adjust an optimum position of the permanent magnets during the assemblying operation in order to minimize the influence of the magnetic flux upon the various parts of the instrument. In accordance with the invention, the yoke of the dynamoelectric machine is secured to a suitable seat of the instrument by means of set screws of a magnetizable material, thus facilitating the mounting operation without degrading the performance of the yoke. By providing projections which are used to position the permanent magnets, the position of the permanent magnets within the motor as well as their position in the overall instrument when the motor is mounted therein can be adjusted in a favorable manner. Such an arrangement is shown in FIGS. 31 and 32.

Figure 31:
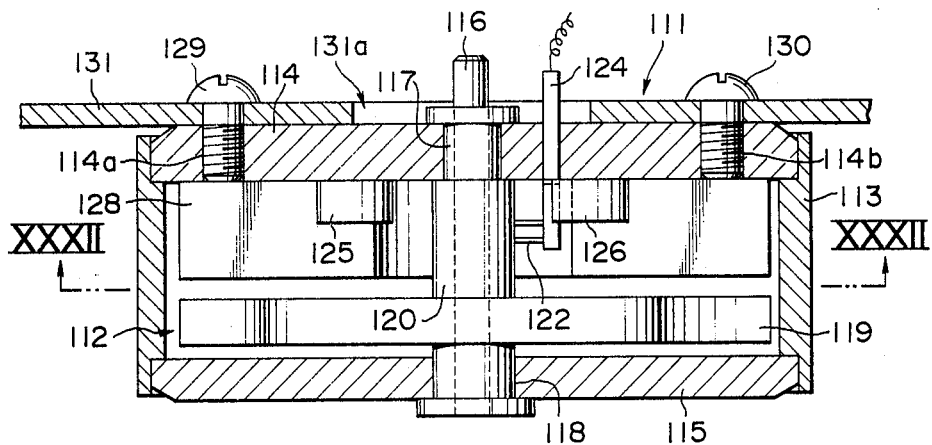
FIG. 31 is a longitudinal section of a flat miniature motor constructed in accordance with still another embodiment of the invention.
Figure 32:
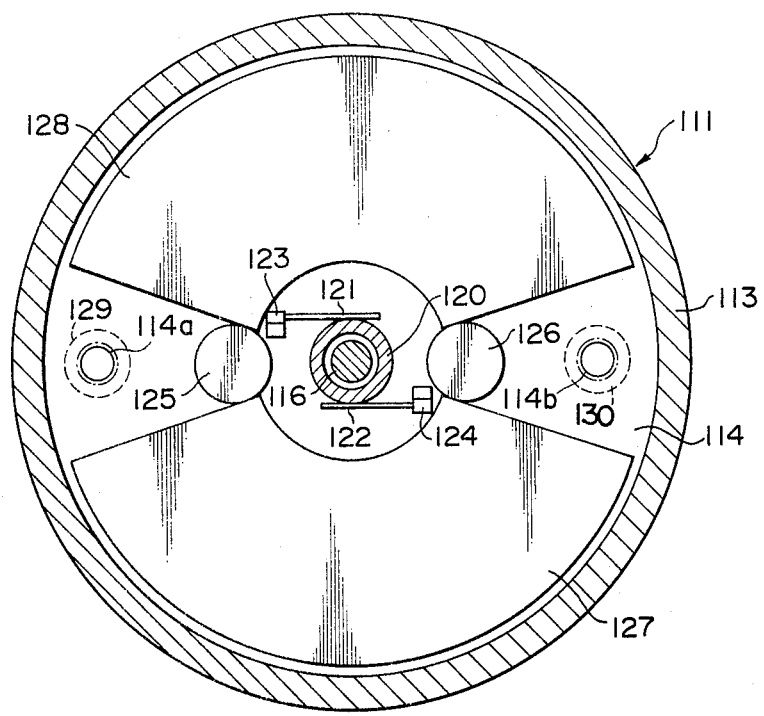
FIG. 32 is a top view, partially in cross section, of the motor shown in FIG. 31.

In FIG. 31, a flat miniature motor 111 includes a housing 112 comprising a cylindrical portion 113 and a pair of yokes 114, 115 which are secured to the opposite ends of the cylindrical portion. An output shaft 116 extends through and is rotatably carried by a pair of bearings 117, 118 which are received centrally in the yokes 114, 115. A rotor 119 is fixedly mounted on a portion of the output shaft 116 located within the housing 112 at a position toward the lower bearing 118, and a commutator 120 is integral with the rotor 119 and is located toward the upper bearing 117. As shown in FIG. 32, a pair of brushes 121, 122 are carried by a pair of supports 123, 124 which are in turn secured to the upper yoke 114, these supports extending externally of the yoke 114 for connection with a power source, not shown. The brushes 121, 122 are maintained in sliding contact with the commutator 120 for feeding the rotor 119. At positions above and below the commutator 120 and the brushes 121, 122, as viewed in FIG. 32, a pair of permanent magnets 127, 128 are secured to the upper yoke 114 in opposing relationship with the rotor 119. These magnets are positioned by means of projections 125, 126 to be described later. As shown in FIG. 32, mounting apertures 114a, 114b are formed in the upper yoke 114 and engaged by set screws 129, 130 of a magnetizable material. The set screws 129, 130 are adapted to engage a support plate 131 which is located on an instrument such as a tape recorder, as shown in FIG. 31, thereby fixing the motor 111 onto the support plate 131. It will be noted that the support plate 131 is formed with an opening 131a for passing the output shaft 116 and other members therethrough.

The projections 125, 126 are fixedly mounted on the upper yoke 114 in alignment with the line joining the mounting apertures 114a, 114b. The projections 125, 126 has a thickness which serves controlling the spacing between the pair of permanent magnets 127, 128. Specifically, the position of the magnets relative to the yoke 114 can be determined by urging their inner edge against these projections 125, 126. Since the projections 125, 126 assume a predetermined position relative to the mounting apertures 114a, 114b, the permanent magnets 127, 128 can be located in an optimum orientation when the motor 111 is secured to the support plate 131, by choosing a suitable position in the support plate 131 for engagement with the set screws 129, 130. It should be understood that the number, configuration and thickness of the positioning projections can be varied as desired.

The flat miniature motor according to the invention can be mounted on an associated instrument in a number of ways as illustrated in FIGS. 33 to 35. In FIG. 33, a motor casing 136 is integrally molded with a plurality of lugs 142, 143, 144 at its bottom and spaced apart around the periphery, the lugs being provided with openings 142a, 143a, 144a which serve the mounting. In FIG. 34, the casing 136 is integrally molded with similar mounting lugs 142, 143 around its periphery, but intermediate the length thereof. In FIG. 35, the casing 136 is integrally molded with a pair of extensions 145, 146 which extend in a common plane and which are formed with mounting apertures 145a, 145b, 146a. In this manner, the casing 136 may be provided with any desired members of mounting lugs at suitable positions. The integral molding of mounting lugs on the casing permits a mass production and a reduction in the manufacturing cost. In addition, the vibration of the entire motor can be reduced, and if desired, the casing may be formed of a vibration absorbing material which may be a synthetic resin of a suitable hardness.

FIG. 36 shows an embodiment in which a casing is formed by a synthetic resin including a powder of a magnetizable material dispersed therein. In this Figure, a motor shaft 151 extends through a pair of bearings 152, 153 which are fitted into a pair of disc-shaped yokes 154, 155. The pair of yokes 154, 155 are connected together by a cylindrical casing 156 which is molded from a synthetic resin including a dispersion of powder of a magnetizable material, thus constituting a motor housing 157.

Inside the motor housing 157, a rotor 158 is fixedly mounted on the shaft 151 toward the lower bearing 153 while a commutator 159 is integrally attached to the rotor 158 and is located thereabove. A pair of permanent magnets 160, 161 are secured to the inside of the upper yoke 154 in a manner to surround the commutator 159, and a pair of brushes 162, 163 adapted to engage the periphery of the commutator 159 are located intermediate the commutator 159 and the permanent magnets 160, 161 by being pivotally mounted on the upper yoke 154.

The motor shown has a magnetic circuit which is indicated by a plurality of arrows a, b, c, d, e, and f. Leakage of magnetic flux from the magnetic paths b and e which are located adjacent to the cylindrical portion 156 is prevented by molding the casing 156 from a synthetic resin dispersed with a suitable amount of powder of a magnetizable material. This removes the need for the provision of a shield material such as a metal plate for covering the outside of the casing 156, thus further contributing to a reduction in the size and the manufacturing cost of the entire machine.

FIG. 37 shows a motor which is similar to that shown in FIG. 36 except that a casing 156a is formed of a synthetic resin and is externally coated with a high frequency shielding layer 164 of an electrically conductive material such as copper, permalloy or the like which is applied by the electroplating or evaporation process. It will be appreciated that the shielding layer 164 serves isolating electrical noises which may be generated within the motor.

Figure 38:
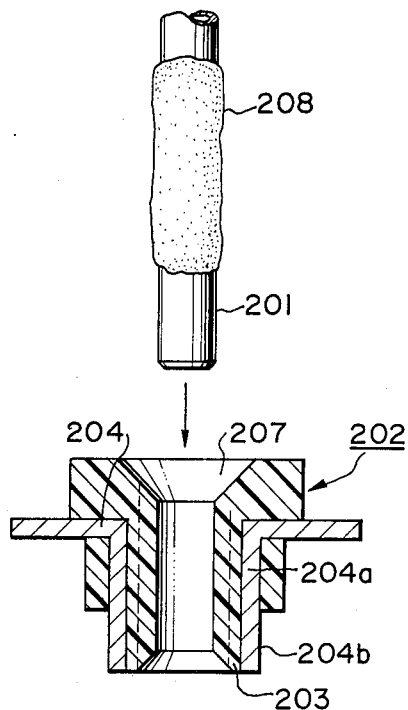
FIG. 38 is a combination of side elevation and cross section, illustrating the manner of integrally coupling an output shaft and a commutator together.
Figure 39:
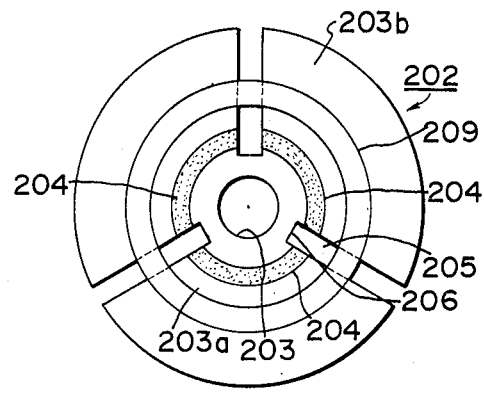
FIG. 39 is a bottom view of a commutator.
Figure 40:
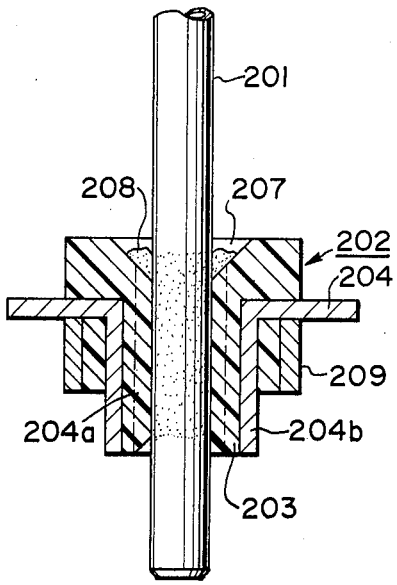
FIG. 40 is a side elevation of an output shaft having a commutator fixedly mounted thereon, the commutator being shown in cross section.

One example of the assembly of the rotor in the flat miniature motor according to the invention will now be described with reference to FIGS. 38 to 43. There is provided an output shaft 201 and a commutator 202 as shown in FIG. 38. The commutator 202 comprises a sleeve 203 of a synthetic resin material, and a plurality of commutator segments 204 (see FIG. 39), which are three in the example shown, integrally applied to the outer periphery of the sleeve 203 with a given spacing 205 therebetween. In forming the commutator 202, the sleeve 203 is molded so as to embed portions 204a of the segments 204 which are not in sliding contact with the brushes, into the sleeve 203, and thereafter grooves 206 are formed in the sleeve at positions corresponding to the spaces 205 between adjacent segments 204. At its end into which the shaft 201 is inserted, the sleeve 203 is chamfered to an increased degree, thus forming a recess 207 for storing an adhesive.

Subsequently, an adhesive 208 is applied to the portion of the shaft 201 which is to be mounted inside the commutator as illustrated in FIG. 38, and the shaft 201 is inserted into the commutator 202 or sleeve 203 from the side where the recess 207 is provided, thus fitting it into the commutator 202 and adhesively securing it to the latter. At this time, the adhesive 208 applied to the shaft 201 is squeezed into the recess 207, thus preventing its flow to other portions of the commutator assembly. The adhesive 208 stored in the recess 207 will become solidified therein, strengthening the bonding between the shaft 201 and the sleeve 203 or commutator 202.

After mounting the commutator 202 on the shaft 201 in this manner, a ring 209 of a synthetic resin having heat resistance is fitted around the portion 204a of the commutator 202 which is not engaged by the brushes, thus covering the spaces 205 between adjacent commutator segments 204 in such region 204a. At the same time, the ring 209 serves strengthening the mounting of the commutator segments 204 onto the sleeve 204.

Figure 42:
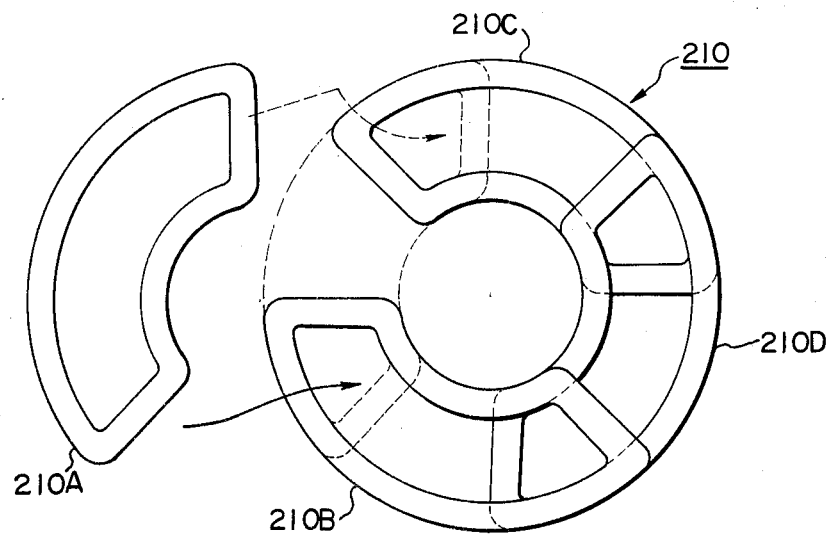
FIG. 42 is a plan view, illustrating the assembly of a rotor winding.

A plurality of sectorial flat coils 210A, 210B . . . 210D (see FIG. 42) are then disposed around the portion 204a of the commutator 202, with the ends of the coils being disposed in overlapping relationship. The coils are electrically interconnected and are also electrically connected with individual commutator segments 204 of the commutator 202. FIG. 42 shows that a coil assembly 210 is formed by disposing one end of the coil 210A above one end of the coil 210B and disposing the other end of the coil 210A below one end of the other adjacent coil 210C, in the manner shown by arrows indicated in solid and dotted lines.

Figure 43:
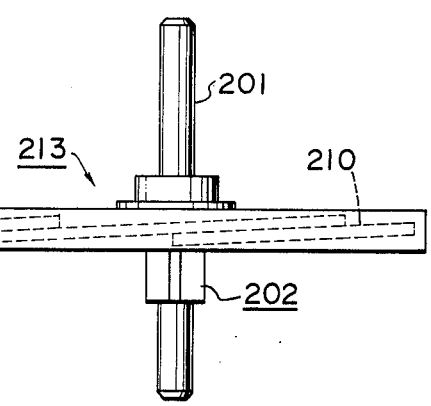
FIG. 43 is a side elevation of a rotor, a commutator and an output shaft which are integrally coupled together by the molding process.
Figure 41:
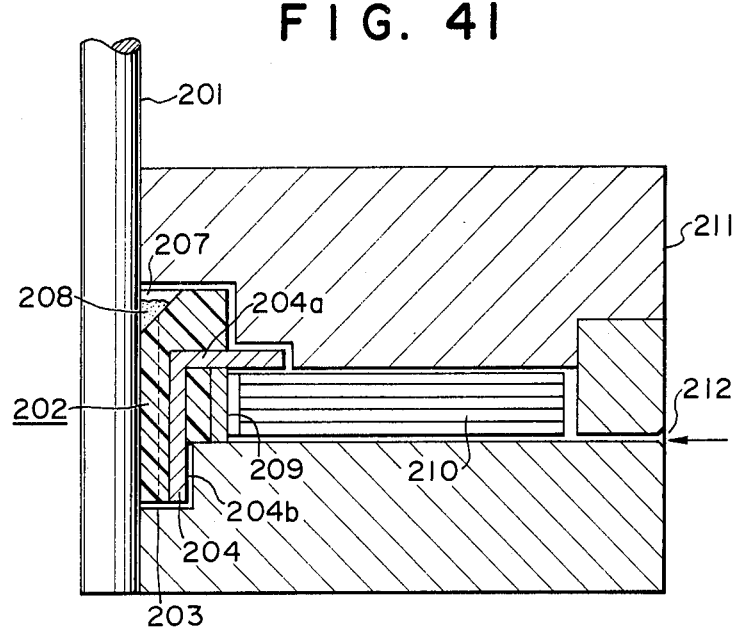
FIG. 41 is a combination of side elevation and cross section, illustrating the process of molding a rotor and a commutator.

After the electrical interconnection is completed, the coil assembly 210 is placed into a mold 211 together with the commutator 202 and the output shaft 201, and a molding material of synthetic resin which is heated to its molten state is poured into the mold through a gate 212, thus connecting the coil assembly 210 integrally with the commutator 202 by means of the poured synthetic resin. It should be noted that the mold 211 prevents a flow of the synthetic resin into the portion 204b of the commutator 202 which is engaged by the brushes. In addition, a flow of the synthetic resin into the spaces 205 between adjacent commutator segments 204 in the region of the portion 204a is prevented by the ring 209. When the synthetic resin poured into the mold 211 is set, the entire assembly may be released from the mold, whereupon there is obtained a coreless rotor 213 having the commutator 202 fixedly mounted on the shaft 201 and having the coil assembly 210 integrally connected by the synthetic resin with the outer periphery of the non-brush engaging portion 204a of the commutator 202, as shown in FIG. 43.

While the invention has been described as applied to an electric motor, it should be understood that the invention can be equally applied to a generator as well. In one example, the motor according to the invention has a diameter of 3.0 cm and a height on the order of 1.0 cm. However, it should be understood that further miniaturization is possible in accordance with the invention.

What is claimed is:

1. A flat miniature dynamoelectric machine, comprising:
    an output shaft lyng along a first axis;
    a cylindrical commutator coaxial with and mounted on said output shaft;
    a flat coreless rotor coaxial with and mechanically coupled to said output shaft, said commutator located between said rotor and output shaft, the electrical connection between said commutator and said rotor being located on a first side of said rotor;
    a housing including an adjustably mounted disk shaped yoke lying in a plane perpendicular to said first axis;
    a bearing for rotatably supporting said output shaft;
    a brush supporting plate mounted on said yoke, said brush supporting plate including an opening for receiving said bearing;
    a brush assembly including at least two contact brushes in slidable contact with said commutator, said brushes being located on a second side of said rotor, said brush assembly being mounted on said brush supporting plate and being located in a position which permits access to said brushes from said opening in said brush supporting plate;
    means for removably supporting said bearing in said opening whereby said bearing may be removed when access to said brushes is desired.

2. A flat miniature dynamoelectric machine according to claim 1 in which said yoke is peripherally provided with a knurling, permitting a rotation of the yoke to adjust the angular position of said contact brushes with respect to said commutator.

3. A flat miniature dynamoelectric machine according to claim 1 in which said brush assembly includes electrically conductive screws in electrical contact with said brushes and secured to said yoke, said screws extending externally of the machine to provide external terminals.

4. A flat miniature dynamoelectric machine according to claim 1 in which said bearing is formed of a synthetic resin, said bearing supporting a first end of said output shaft, said machine further including a second, oilless bearing remotely located from said first bearing and rotatably supporting said output shaft.

* * * * *